United States Patent [19]

Danca

[11] Patent Number: 5,394,641
[45] Date of Patent: Mar. 7, 1995

[54] ANIMAL BLOCKAGE DEVICE

[76] Inventor: Philip C. Danca, 3N 781 Wooddale Rd., Addison, Ill. 60101

[21] Appl. No.: 82,343

[22] Filed: Jun. 24, 1993

Related U.S. Application Data

[63] Continuation of Ser. No. 903,008, Jun. 23, 1992, abandoned.

[51] Int. Cl.⁶ .............................................. A01M 1/00
[52] U.S. Cl. .......................................... 43/124; 43/58; 43/108; 119/52.3
[58] Field of Search ....................... 43/58, 108, 1, 107, 43/124; 47/23, 24; 119/52.3, 57.9

[56] References Cited

U.S. PATENT DOCUMENTS

| | | | |
|---|---|---|---|
| 57,937 | 9/1866 | Mathews | 43/108 |
| 58,866 | 10/1866 | Mendenhall | 43/108 |
| 228,393 | 6/1880 | Richards | 47/24 |
| 1,994,101 | 3/1935 | Hawkins | 43/108 |
| 2,253,541 | 8/1941 | Torbett | 43/108 |
| 2,261,360 | 11/1941 | Gerendas | 43/108 |
| 2,746,201 | 5/1956 | Warrell | 43/108 |
| 4,389,975 | 6/1983 | Fisher | 119/52.3 |

*Primary Examiner*—Kurt Rowan
*Attorney, Agent, or Firm*—Edward D. Manzo

[57] ABSTRACT

An animal blockage device having a series of casings movably surrounding a support member to prevent squirrels or other animals from traveling up the support member.

7 Claims, 2 Drawing Sheets

FIG. 1
FIG. 2
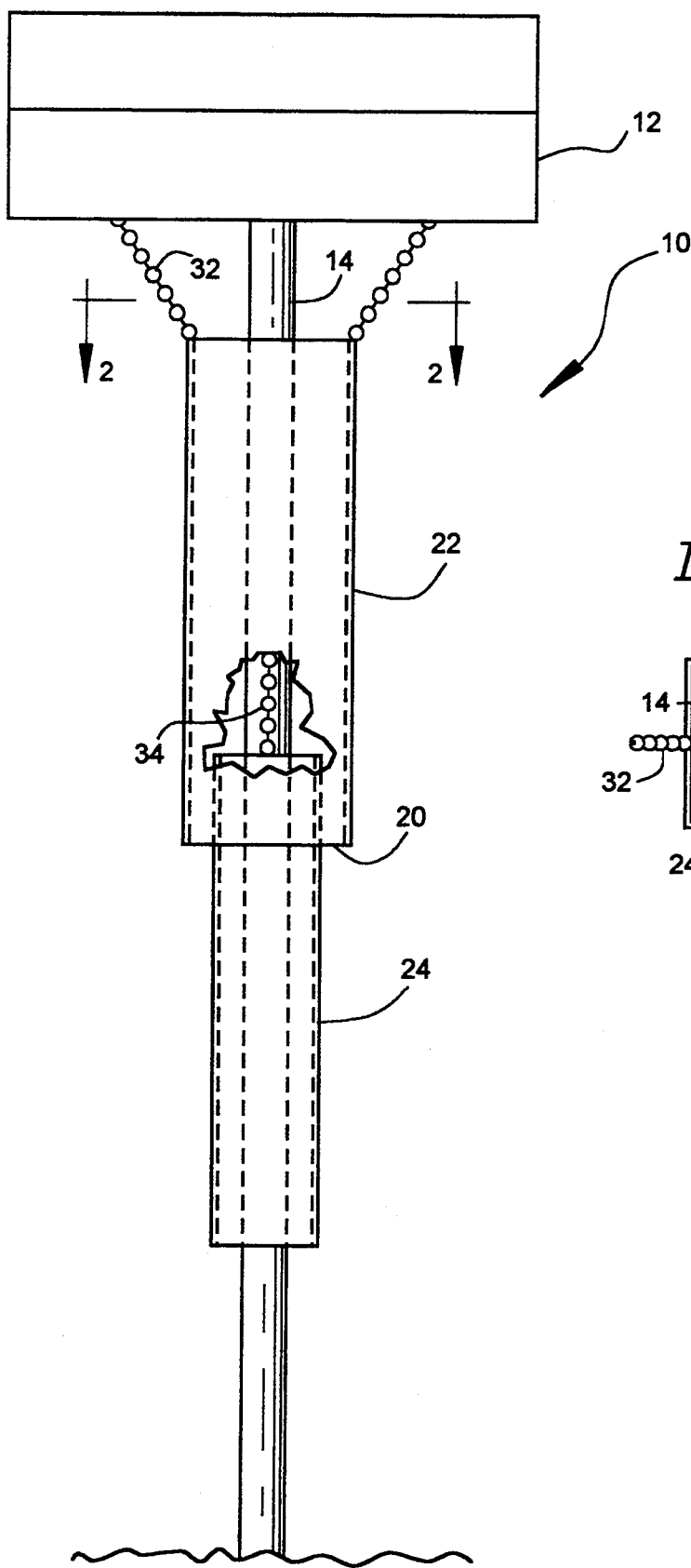
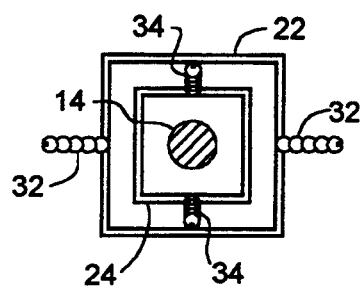

ANIMAL BLOCKAGE DEVICE

This is a continuation of application Ser. No. 07,903,008, filed on Jun. 23, 1992, now abandoned.

Field of the Invention

This invention relates to an animal blockage device, and more particularly to an animal blockage device for preventing squirrels or other undesired rodents or other animals from ascending a pole to reach, for example, a bird feeder. The invention could find application in other applications where animals are to be prevented from climbing up support poles or other structures.

Description of the Prior Art

Rodents, such as squirrels, and other animals can often climb and reach undesired locations. Further, bird feeders, which provide a source of food for birds and pleasure for those who watch birds, are often raided by squirrels and other animals. Because of a squirrel's ability to climb trees or poles where bird feeders are often placed, it is difficult to keep these rodents away from the seed in the bird feeder.

An object of the invention is to provide an animal blockage device which has a simple but effective device to keep rodents from ascending a pole.

A further object of the invention is to provide a low cost animal blockage device which is easy to construct.

SUMMARY OF THE INVENTION

The present invention comprises a structure which prevents rodents such as squirrels (or other animals) from reaching, for example, bird seed in a bird feeder. An animal blockage device comprises a pole for supporting a conventional bird feeder or bird house or other structure. Suspended from the bird feeder is a casing or a series of casings of different sizes. The casings preferably "telescope" so that a smaller one fits within a larger one. Preferably the casings are hollow tubes or hollow rectangular structures which are square in cross-section. The casings are sized to prevent an animal from traveling further up the pole, while also providing an unstable environment if the animal were to try to travel outside the casing. The casings are attached to one another and the bird feeder by chains or other suitable attachment devices. While any number of casings and any shape of casing can be used, the preferred embodiment includes two rectangular shaped casings. The smallest diameter (size) casing is preferably lowest on the support pole, and the larger diameter casing(s) are located in a sequence corresponding to their diameter (size).

BRIEF DESCRIPTION OF THE DRAWINGS

In describing the present invention, reference is made to the accompanying drawings wherein:

FIG. 1 is a side view of a first embodiment of the animal blockage device having casings to prevent animals from ascending a pole.

FIG. 2 is a cross-sectional view of the animal blockage device taken at lines A—A shown in FIG. 1.

DESCRIPTION OF THE PREFERRED EMBODIMENT

Figure 3:
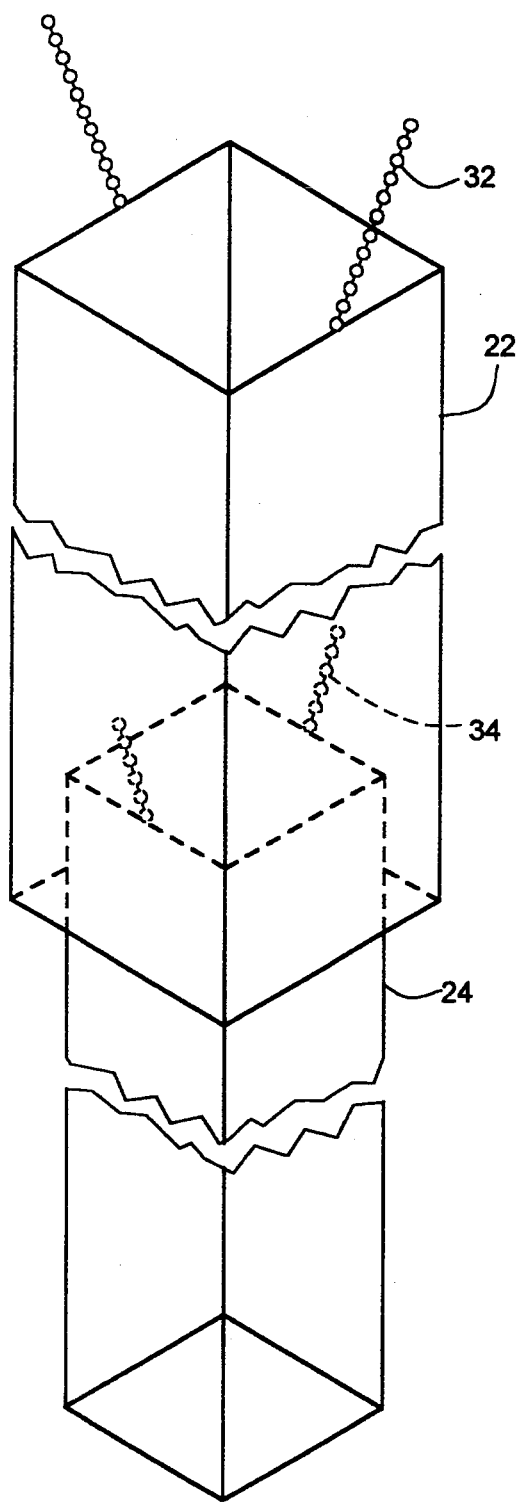
FIG. 3 is a perspective view of the casings shown in FIG. 1 in isolation.
Figure 4:
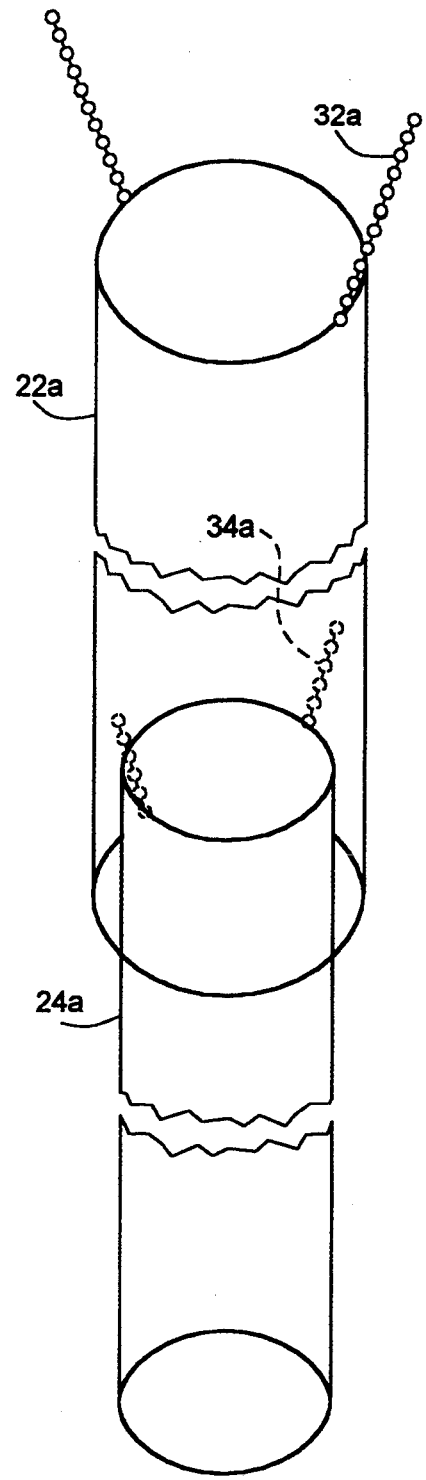
FIG. 4 is a side view of a second embodiment of the animal blockage device.

An animal blockage device constructed according to the present invention is configured to prevent rodents such as squirrels or other animals from climbing vertical support structures, especially poles on which bird feeders are mounted. While primarily intended to protect the bird seed from squirrels, the invention would also protect the birds and their eggs from other predators or generally prevent animals from ascending poles or other support structures.

As shown in FIG. 1, the animal blockage device 10 cooperates with container 12, such as a conventional bird house or bird feeder, which is supported by a pole or other vertically oriented support member 14. Attached to the container is casing unit 20, including an upper casing 22 and a lower casing 24. Although only two casings are shown, any number of casings could be used within the scope of the present invention.

Preferably, the casings are either square or round tubes, although other shapes could be used. FIG. 2 shows a cross-section of the square casings shown in FIG. 1 taken at lines A—A. As shown in FIG. 3, the casings are attached to one another by chains 34 or any other preferably movable attachment device, including but not limited to a spring, elastic member, wire or cord. The upper casing is also attached to container 12 by chains 32 or other attachment devices. Thus, in the preferred embodiment, all of the casings are coupled to the container and hang down, without support from the pole except to the extent that the pole supports the container. Alternatively, the upper casing could be coupled movably to the pole 14 by similar means to that used for the coupling the upper casing to container 12.

The lower casing is of a smaller diameter than the upper casing, and is positioned between the pole and the upper casing such that there is some overlap of the lower casing and upper casing. Preferably the size of the lower casing relative to the pole is such that when a rodent reaches the bottom of casing 24, it cannot continue to ascend vertical support member 14. That is, the configuration of lower casing 24 is such that the rodent (or other predator) cannot continue the ascent within or through casing 24.

That is, when a squirrel attempts to climb up the feeder, it eventually reaches the lower casing. Because the lower casing is sized so that the squirrel is unable to crawl into the space between the pole and the lower casing, the squirrel is forced to attempt to climb onto the outside of the lower casing. However, lower casing 24 is not affixed to member 14 and is mounted in such a way that it will wobble when manipulated by the would-be intruder. The wobble action of the lower casing will deter most animals from proceeding further.

While some animals may be able to negotiate around the outside of the lower casing 24, they preferably are not able to enter the region between the upper and lower casings upon reaching the upper casing 22 because of the narrow gap between the upper and lower casings. Alternatively, a blocking element to fill that space can be provided, and such a blocking element could be used also between lower casing 24 and pole 14. In addition, and as noted with respect to the lower casing 24, any attempt to climb on the outside of the upper casing 22 also causes the upper casing to wobble. With its front paws on the upper casing 22 and its rear paws on the lower casing 24, the squirrel is unable to travel any further. Because both casings will wobble and will generally move independent of one another, the squirrel will lose its grip and will return to the ground, voluntarily or otherwise.

In the preferred embodiment, the pole 14 is made of aluminum, plastic or other suitable material and is preferably 1 inch in diameter. It may be square or round. Preferably, the pole is of a height such that most rodents cannot reach the container by merely jumping. Also, the two casings are approximately 14 inches in length and made of plastic, metal or other suitable material. It is preferred that the outside surfaces be relatively smooth so as to reduce the animal's grip thereon. As shown in FIG. 2, the cross-section of the lower casing is a square having a side or diameter which is approximately $2\frac{1}{2}$ inches. The upper cross-section casing is also a square having a side of approximately $3\frac{5}{8}$ inches. Preferably, the upper and lower casings overlap by approximately 1 inch. However, any dimensions of casings could be used, depending upon the size of pole and the size of the squirrels or other animals which are intended to be deterred from ascending the pole.

While this specification refers to specific elements and dimensions, these references are not intended as limitations. Rather the specification is intended to cover any substitutes which are well known in the art. For example, the upper casing could be attached by chains or other means to the pole rather than the container itself. In addition, the casings could be suspended around a tree trunk to prevent squirrels from traveling up a tree to reach a bird house or nest located in the tree. Therefore, while the preferred embodiments have been described in detail, certain changes and modifications can be made without departing from the scope of the invention as defined by the following claims.

I claim:

1. An animal blockage device for use with a support member which is to be protected from ascension by animals, comprising:
   an upper hollow casing and a lower hollow casing, said casings being rigid and having different respective opening to movably surround said support member, the opening of the upper casing being larger than the opening of the lower casing;
   first and second attachment members, said first attachment members movably attaching said upper casing directly or indirectly to said support member;
   the lower casing being movably attached by said second attachment members to said upper casing in such fashion that the top of the lower casing hangs from the upper casing via the second attachment members;
   wherein the first attachment members are spaced vertically from the second attachment members;
   wherein each of the upper and lower casings is laterally movable with respect to the support member when said support member is generally vertically oriented, so that when an animal seeking to ascend the support member encounters either said casing, the casing so encountered moves laterally to present an unstable surface;
   wherein said casings are hollow, rectangular structures and each extend approximately 14 inches along the support member;
   wherein said support member is a pole having a diameter or lateral dimension of approximately 1 inch; and
   wherein said upper casing has a diameter or lateral dimension of approximately $3\frac{5}{8}$ inches and said lower casing has a diameter or lateral dimension of approximately $2\frac{1}{2}$ inches.

2. An animal blockage device for use with a support member which is to be protected from ascension by animals, comprising:
   an upper hollow casing and a lower hollow casing, said casings being rigid and having different respective opening to movably surround said support member, the opening of the upper casing being larger than the opening of the lower casing;
   first and second attachment members, said first attachment members movably attaching said upper casing directly or indirectly to said support member;
   the lower casing being movably attached by said second attachment members to said upper casing in such fashion that the top of the lower casing hangs from the upper casing via the second attachment members;
   wherein the first attachment members are spaced vertically from the second attachment members;
   wherein each of the upper and lower casings is laterally movable with respect to the support member when said support member is generally vertically oriented, so that when an animal seeking to ascend the support member encounters either said casing, the casing so encountered moves laterally to present an unstable surface;
   wherein said casings are tubes and each extend approximately 14 inches along the support member;
   wherein said support member is a pole having a diameter of approximately 1 inch; and
   wherein said upper casing has a diameter of approximately $3\frac{5}{8}$ inches and said lower casing has a diameter of approximately $2\frac{1}{2}$ inches.

3. An animal blockage device for a support member comprising:
   upper and lower casings each surrounding said support member, said upper casing having a larger width or lateral dimension than the width or lateral dimension of said lower casing;
   a first pair of chains for attaching said upper casing directly or indirectly to said support member; and
   a second pair of chains for attaching said upper casing to said lower casing such that a portion of said upper casing is attached to and overlaps said lower casing to provide an unstable surface.

4. The animal blockage device of claim 3 wherein said support member is to be protected from ascension by mammals.

5. The animal blockage device of claim 3 wherein said casings are rigid and have an open end to movably surround said support member.

6. The device of claim 3 wherein said casings are rectilinear and rigid.

7. The device of claim 3 wherein said casings are cylindrical and rigid.

* * * * *